(12) United States Patent
Daigle

(10) Patent No.: US 8,882,435 B2
(45) Date of Patent: Nov. 11, 2014

(54) PIVOTING TAILGATE SHOVELING APPARATUS

(76) Inventor: Steve Daigle, Tomahawk, WI (US)

( * ) Notice: Subject to any disclaimer, the term of this patent is extended or adjusted under 35 U.S.C. 154(b) by 477 days.

(21) Appl. No.: 13/018,233

(22) Filed: Jan. 31, 2011

(65) Prior Publication Data

US 2012/0195735 A1   Aug. 2, 2012

(51) Int. Cl.
| | |
|---|---|
| B60P 1/26 | (2006.01) |
| B60P 1/28 | (2006.01) |
| B60H 1/00 | (2006.01) |
| E01C 19/08 | (2006.01) |
| E01C 23/06 | (2006.01) |

(52) U.S. Cl.
CPC ............ B60P 1/283 (2013.01); B60H 1/00014 (2013.01); B60P 1/26 (2013.01); E01C 19/08 (2013.01); E01C 23/06 (2013.01)
USPC .............................. 414/472; 414/557; 296/58

(58) Field of Classification Search
USPC ....................... 296/26.1, 26.11, 183.2, 58–60; 298/23 MD; 414/472, 557
See application file for complete search history.

(56) References Cited

U.S. PATENT DOCUMENTS

| | | | | |
|---|---|---|---|---|
| 701,320 | A | * | 6/1902 | Fisher .............................. 296/58 |
| 749,187 | A | * | 1/1904 | Hanlon ............................ 296/58 |
| 800,079 | A | * | 9/1905 | Converse ......................... 296/58 |
| 1,395,300 | A | | 11/1921 | Sanders |
| 1,526,934 | A | * | 2/1925 | Robbins .......................... 296/58 |
| 1,563,202 | A | | 11/1925 | Lentz |
| 2,249,932 | A | | 7/1941 | Beal |
| 2,678,121 | A | | 5/1954 | Phillips |
| 2,712,876 | A | | 7/1955 | Kuehn, Jr. |
| 2,719,637 | A | * | 10/1955 | Wood ............................ 414/557 |
| 3,366,418 | A | | 1/1968 | Lackey |
| 3,498,486 | A | | 3/1970 | Freeman, Jr. |
| 3,572,837 | A | | 3/1971 | Lackey |
| 3,602,402 | A | | 8/1971 | Garden |
| 3,719,298 | A | | 3/1973 | Brown |
| 3,889,827 | A | * | 6/1975 | Fine .............................. 414/557 |
| 3,910,437 | A | | 10/1975 | James |
| 3,977,718 | A | | 8/1976 | Nordberg |
| 4,076,310 | A | | 2/1978 | Schwalm |
| 4,157,150 | A | | 6/1979 | Hetrick |

(Continued)

OTHER PUBLICATIONS

Steve Daigle, Affidavit, Jun. 30, 2011, 2 pgs (prior art more than one year).

(Continued)

*Primary Examiner* — Jonathan Snelting
(74) *Attorney, Agent, or Firm* — Thomas D. Wilhelm; Wilhelm Law, S.C.

(57) ABSTRACT

A tailgate shoveling apparatus includes a containment bed mounted on a vehicle for contained material therein, and a tailgate shoveling platform pivotably attached proximate an end of the containment bed. The tailgate shoveling platform pivots between two positions rotationally offset by substantially more than 90 degrees in relation to each other. The tailgate shoveling platform substantially prevents material from spilling out of the containment bed in a first position. In a second position, the tailgate shoveling platform provides a platform configured to hold a portion of the material contained in the containment bed at an ergonomic shoveling height relative to a user standing on ground level. Once a desired amount of material has been removed from the platform, the tailgate shoveling platform may return unused material back into the containment bed as the tailgate shoveling platform moves back into the first position.

14 Claims, 5 Drawing Sheets

(56) References Cited

U.S. PATENT DOCUMENTS

| | | | |
|---|---|---|---|
| 4,329,101 A | 5/1982 | Green et al. | |
| 4,496,265 A | 1/1985 | Fragale | |
| 4,505,632 A | 3/1985 | Quenzi | |
| 4,723,817 A | 2/1988 | Wallan | |
| 5,100,277 A | 3/1992 | Musil | |
| 5,120,182 A | 6/1992 | Hvolka | |
| 5,141,384 A | 8/1992 | Hvolka | |
| 5,176,486 A | 1/1993 | Park | |
| 5,197,848 A | 3/1993 | Musil et al. | |
| 5,407,251 A | 4/1995 | Ritchie, II et al. | |
| 5,470,175 A | 11/1995 | Jensen et al. | |
| 5,501,402 A | 3/1996 | Jones | |
| 5,584,642 A | 12/1996 | Huntoon | |
| 5,732,764 A * | 3/1998 | Douglas et al. | 165/41 |
| 5,749,620 A | 5/1998 | Carrier | |
| 5,816,638 A | 10/1998 | Pool, III | |
| 5,823,630 A | 10/1998 | Graham | |
| 5,951,233 A | 9/1999 | Boucher et al. | |
| 6,176,673 B1 * | 1/2001 | Moyna et al. | 414/517 |
| 6,217,122 B1 | 4/2001 | Kirbie | |
| 6,238,162 B1 | 5/2001 | Mayer et al. | |
| 6,276,738 B1 | 8/2001 | Marshall | |
| 6,302,491 B1 | 10/2001 | Anderson | |
| 6,491,349 B2 | 12/2002 | McCafferty et al. | |
| 6,499,808 B2 | 12/2002 | Palmberg | |
| 6,585,472 B2 | 7/2003 | Hollinrake et al. | |
| 6,648,391 B1 | 11/2003 | Whiteford et al. | |
| 6,742,822 B2 | 6/2004 | Vejnar | |
| 6,764,130 B1 | 7/2004 | Hull | |
| 6,824,183 B1 | 11/2004 | Hodge | |
| 6,880,894 B2 | 4/2005 | Obermeyer | |
| 6,893,203 B2 * | 5/2005 | Anderson et al. | 414/557 |
| 6,929,329 B2 | 8/2005 | Kent et al. | |
| 7,073,867 B2 | 7/2006 | Huenke | |
| 7,111,884 B2 | 9/2006 | Johnson | |
| 7,232,173 B2 | 6/2007 | Katterloher et al. | |
| 7,293,723 B2 | 11/2007 | Niemala et al. | |
| 7,374,389 B2 | 5/2008 | Wilson | |
| 7,607,711 B2 | 10/2009 | Marshall | |
| 2001/0014273 A1 | 8/2001 | Hollinrake et al. | |
| 2005/0002769 A1 | 1/2005 | Scheibel | |
| 2008/0246307 A1 * | 10/2008 | Theener | 296/183.2 |
| 2009/0134664 A1 * | 5/2009 | Theener | 296/183.2 |

OTHER PUBLICATIONS

Pavement Group.Com, Slip-In Asphalt Hot Box, http://www.pavementgroup.com/hot-boxes/slip-in-asphalt-hot-box/, visited Jun. 2, 2011, 1 pg (Copyright 2010).

* cited by examiner

PIVOTING TAILGATE SHOVELING APPARATUS

BACKGROUND

The field of this disclosure relates generally to a tailgate for a vehicle having a containment bed, and particularly, to a tailgate functioning as a shoveling apparatus for holding material from the containment bed.

Roadway surfaces require maintenance to repair wear and tear resulting from traffic, weather, and other factors. These roadways are typically repaired using asphalt, gravel, or other similar materials. It has long been common practice to load the repair material onto a truck bed, drive the truck to the location, and disperse a quantity of the repair material from the truck bed onto the ground either by using a worker with a shovel standing on or near the containment bed to move the repair material or by using a device to dispense quantities of repair material onto the ground. For example, U.S. Pat. No. 5,501,402 of Jones describes a material containment bed having a material distribution opening and a patching pan rotatably and detachably mounted below the material containment bed for receiving the material through the distribution opening. Once the material is removed from the patching pan, the pan is rotated back to a storage position underneath the truck to allow the truck to move freely. Other examples of similar or related apparatuses or attachments for unloading material from a containment bed may be found in the prior art.

The present inventor has recognized various disadvantages with currently available apparatuses and methods for repairing road surfaces, including: having a worker manually remove material from the back of a containment bed, which requires considerable physical exertion by the worker that may result in back problems or repetitive-stress injuries; requiring the worker to stand inside, near, or on the walls of the containment bed, which may pose an increased risk of injury, such as injury from falling; and requiring the worker to stand in a containment bed and work with heated mixtures, which may lead to an increased susceptibility of burn injuries.

The present inventor has also recognized that currently available devices do not provide for a fine control of the amount of material that is removed from the containment bed. Typical devices receive a largely uncontrolled amount of material from the containment bed and lack a mechanism for easily returning any unused material back into the containment bed for future use. Additionally, the present inventor has recognized that current devices usually require significant modifications to the vehicle body or require additional space on the vehicle for mounting, thereby compromising the versatility of the vehicle.

The present inventor has identified a need for a tailgate shoveling apparatus that provides relatively safe and easy access to a material contained in a containment bed without requiring significant modifications to a vehicle body or compromising vehicle versatility. The present inventor has also identified a need for a shoveling platform that contains a portion of a material from a containment bed and lowers such a portion to a comfortable shoveling height, thereby reducing injury risk and providing safe access to the material. Additionally, the inventor has identified a need for a shoveling platform that facilitates conserving material and returning unused material back into the containment bed for future use.

SUMMARY

Apparatuses and methods are disclosed for one or more of improved removal of material from a containment bed, improved shoveling of material from a containment bed, and/or improved return of unused material to a containment bed. In certain preferred apparatuses and/or methods, a tailgate shoveling platform contains material in a containment bed in a closed (first) position, holds a portion of such material at an ergonomic shoveling placement in an open (second) position, and returns unused material to the containment bed when moving from the open position to the closed position.

For example, one embodiment includes a containment bed mounted on a vehicle for containing material therein, and a tailgate shoveling platform pivotably attached to an end of the containment bed. The tailgate shoveling platform pivots between two positions rotationally offset from each other by substantially more than 90 degrees. In a closed position, the tailgate shoveling platform contains material in a containment bed to prevent material from spilling. In an open position, the tailgate shoveling platform provides a platform that holds a portion of a material from the containment bed at an ergonomic shoveling placement. In such a position, the tailgate shoveling platform is spaced apart from the ground at a height for convenient and safe access to the material. Once a desired amount of material has been removed from the shoveling platform, the tailgate shoveling platform may dump unused material back into the containment bed as the tailgate shoveling platform returns to the closed position.

In another exemplary embodiment, the tailgate shoveling platform includes an upper panel and a lower panel adjoined in an angular configuration in relation to each other, with each panel having a substantially planar surface. The tailgate shoveling platform holds a portion of a material by locating the lower panel substantially parallel to and spaced apart from the ground when the tailgate shoveling platform is in an open position. Additionally, the tailgate shoveling platform may include a lip extending from an end of the lower panel to help prevent spilling as the material is loaded onto and unloaded off of the tailgate shoveling platform.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
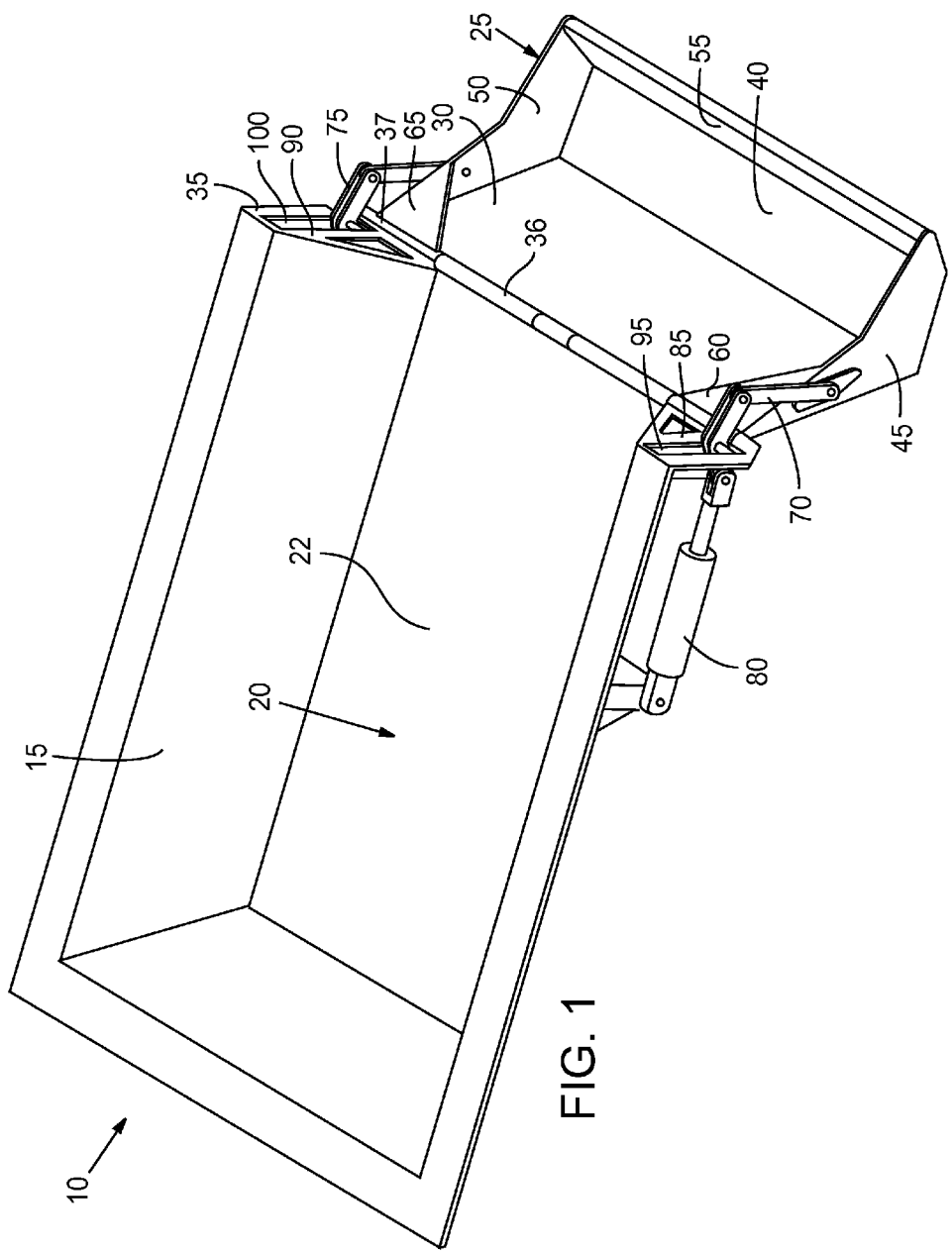
FIG. 1 is a pictorial view of a tailgate shoveling apparatus illustrating a tailgate shoveling platform attached to an end of a containment bed in accordance with one embodiment.

The described features, structures, characteristics, and methods may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or operations are not shown or not described in detail to avoid obscuring aspects of the embodiments.

With reference to FIGS. 1-4, in one example, a vehicle 105 with a tailgate shoveling apparatus 10 may be used to contain gravel, asphalt, or other road repair material (not shown) in a containment bed 20 and to haul that material to a work site. Once at the work site, the material may be unloaded by tilting the containment bed 20 to move the contained material toward a tailgate shoveling platform 25 located along a containment bed end 35. The tailgate shoveling platform 25 may then be lowered from a closed position to an open position to present a portion of the material to a user at a comfortable shoveling height. The user can then remove material from the tailgate shoveling platform 25 as needed to repair the road. Afterward, the tailgate shoveling platform 25 can be returned to its closed position and any unused material remaining on the tailgate shoveling platform 25 is returned to the containment bed 20 for future use. The vehicle 105 can then be driven to another work site.

Figure 2:
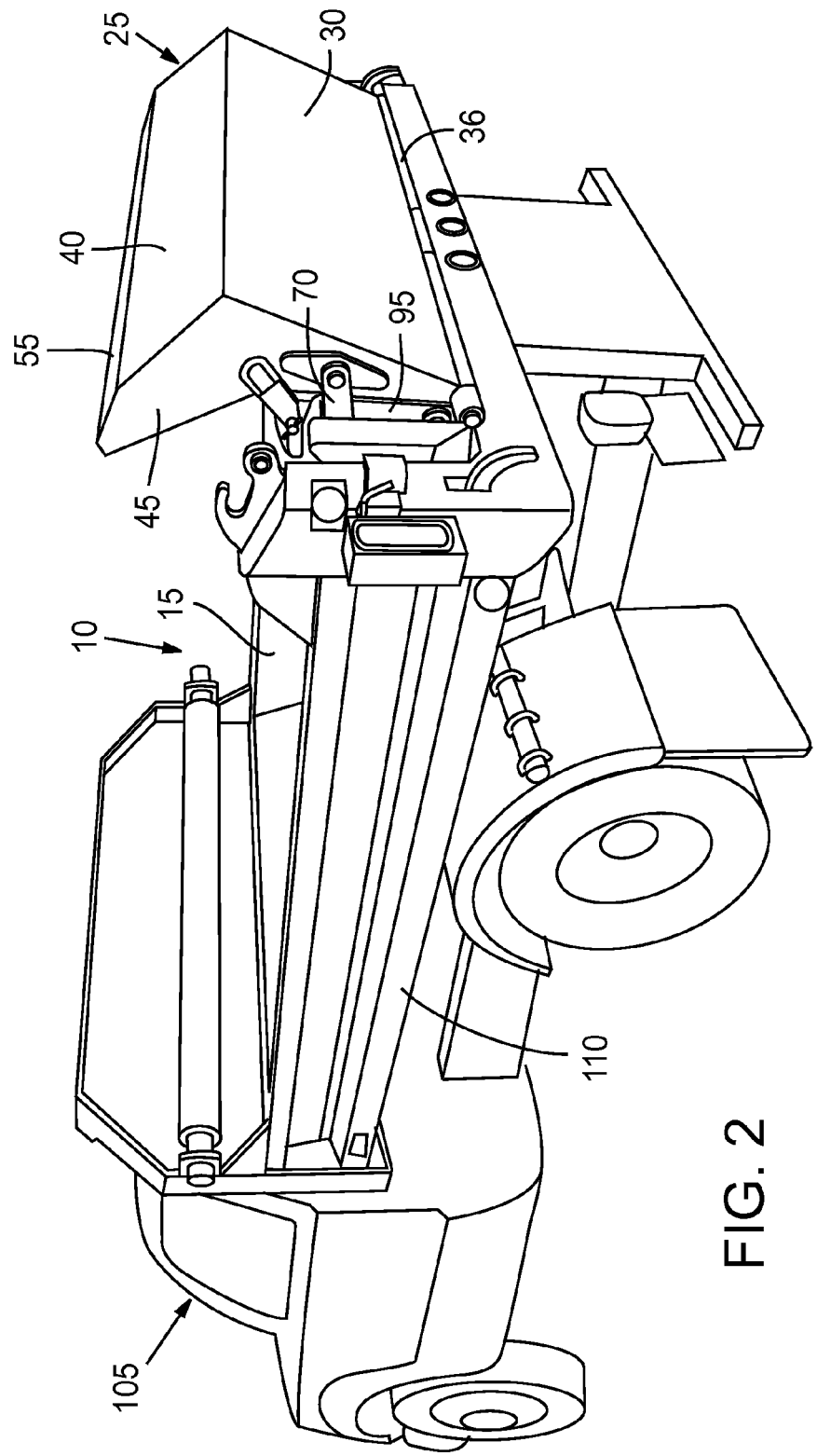
FIG. 2 is a pictorial view of the tailgate shoveling apparatus of FIG. 1 mounted on a vehicle with the tailgate shoveling platform in a closed position.
Figure 3:
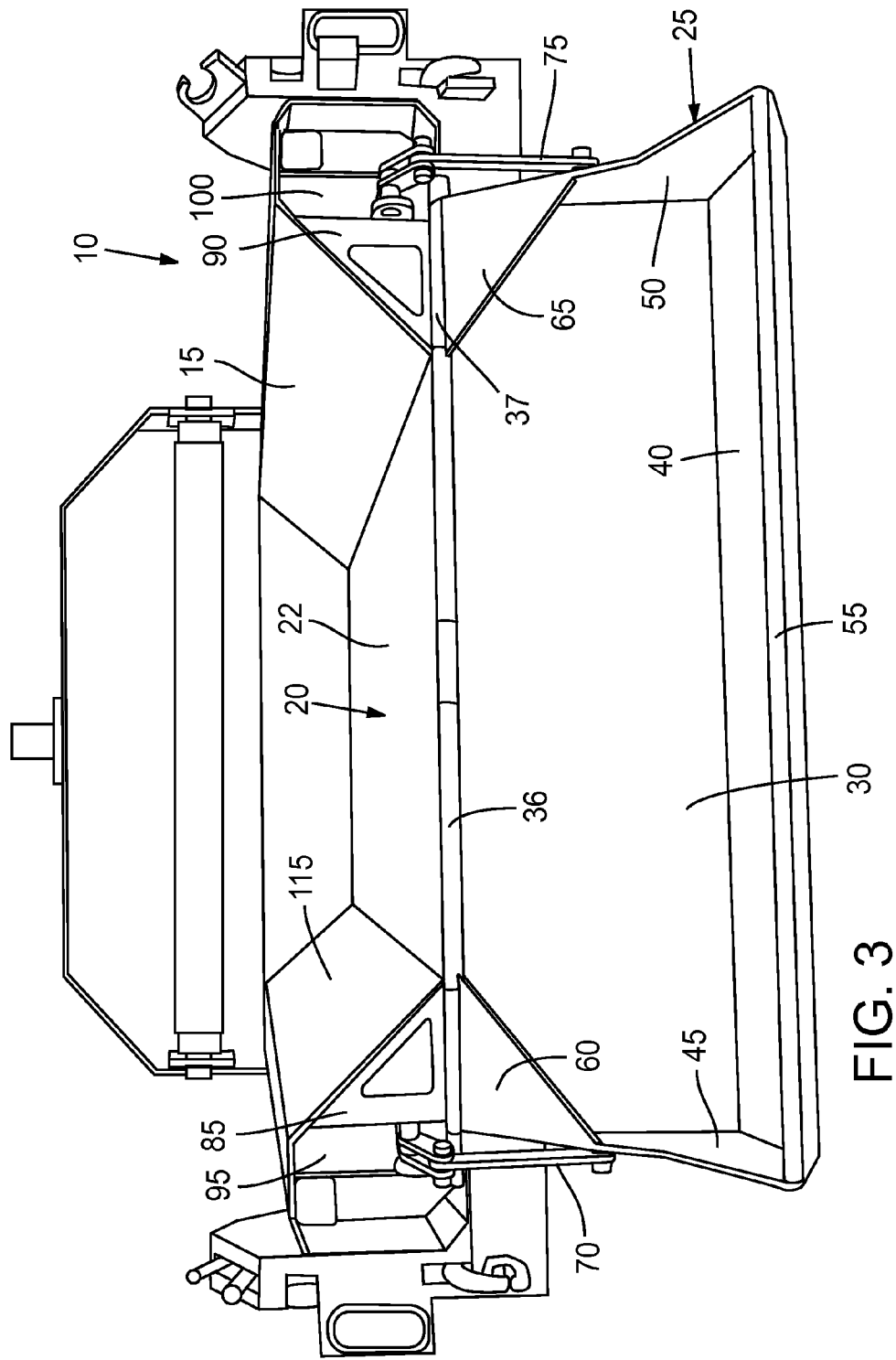
FIG. 3 is a rear view of the mounted tailgate shoveling apparatus of FIG. 1 with the tailgate shoveling platform in an open position.

FIGS. 1-3 collectively illustrate an exemplary embodiment of a tailgate shoveling apparatus 10 mounted on a vehicle 105 with a tailgate shoveling platform 25 shown in the open and closed positions. With reference to FIGS. 1-3, in a preferred embodiment, the tailgate shoveling apparatus 10 includes a containment bed 20 for containing a material therein having a right interior wall 15 and an opposing left interior wall 115. The interior walls 15, 115 have a substantially smooth surface tapering toward a containment bed floor 22 to help direct material toward the center of the containment bed 20. The tailgate shoveling apparatus 10 further includes a tailgate shoveling platform 25 configured to hold a portion of the material in the containment bed 20 when the tailgate shoveling platform 25 is in the open position. The tailgate shoveling platform 25 includes an upper panel 30 and a lower panel 40 each having a substantially planar surface, with a first end of the upper panel 30 pivotably attached to the containment bed 20 along a containment bed end 35 and an opposing second end of the upper panel 30 adjoining a first end of the lower panel 40 in an angular configuration. The tailgate shoveling platform 25 may be attached to the containment bed 20 via a hinge, such as hinge 36, or using other suitable devices. The lower panel 40 includes a lip 55 extending from an opposing second end of the lower panel 40. The lip 55 helps contain material in the lower panel 40 of the tailgate shoveling platform 25.

In a preferred embodiment, the tailgate shoveling platform 25 further includes a left side wall 45 and an opposing right side wall 50, each extending substantially perpendicular in relation to the upper panel 30, the lower panel 40, and the lip 55 for further aiding in containing the material in the tailgate shoveling platform 25. The tailgate shoveling platform 25 also includes a left triangular panel 60 and a right triangular panel 65, connected between a left side wall 45 and the upper panel 30 and between a right side wall 50 and the upper panel 30, respectively. The triangular panels 60, 65 may also be attached to the containment bed 20 via a rod 37, such as by welding or using another suitable attachment method. The triangular panels 60, 65 are each spaced apart from each other and extend over at least a corresponding left and right portion of the upper panel 30, respectively.

In a preferred arrangement, the tailgate shoveling apparatus 10 includes a mechanical system, such as a hydraulic system 80, for moving the tailgate shoveling platform 25 between the open position and the closed position. Such a mechanical system is preferably housed between the interior walls 15, 115 and an exterior wall 110 of vehicle 105. The hydraulic system 80 includes a left linkage 70 and a right linkage 75 operatively connected to the side walls 45, 50, respectively, for moving the tailgate shoveling platform 25 between the open position and the closed position. The interior walls 15, 115 of the containment bed 20 each include a substantially planar triangular left face 85 and right face 90 facing rearward toward the tailgate shoveling platform 25 and dimensioned substantially similar to the triangular panels 60, 65 of the tailgate shoveling platform 25. A first opening 95 and a second opening 100 are located adjacent the triangular faces 85, 90, respectively, and are sized to house the linkages 70, 75 between the interior walls 15, 115 and the exterior wall 110 of the vehicle 105.

When the tailgate shoveling platform 25 is in the closed position, the linkages 70, 75 are housed inside openings 95, 100 and between the interior walls 15, 115 and the exterior wall 110 of the vehicle 105. Additionally, the triangular panels 60, 65 are substantially flush against the triangular faces 85, 90, thereby substantially sealing the containment bed 20 and greatly reducing or eliminating spillage of material from the containment bed 20. With reference to FIGS. 1 and 2, the tailgate shoveling platform 25 preferably rotates in a range of motion substantially more than 90 degrees between the open and closed positions such that the open position is rotationally offset by more than 90 degrees in relation to the closed position. In some embodiments, the tailgate shoveling platform 25 may rotate approximately 150 degrees between the open and closed position. Other embodiments may include the tailgate shoveling platform 25 rotating in a range of motion anywhere between 90 and 180 degrees between the open and closed positions.

Figure 1A:
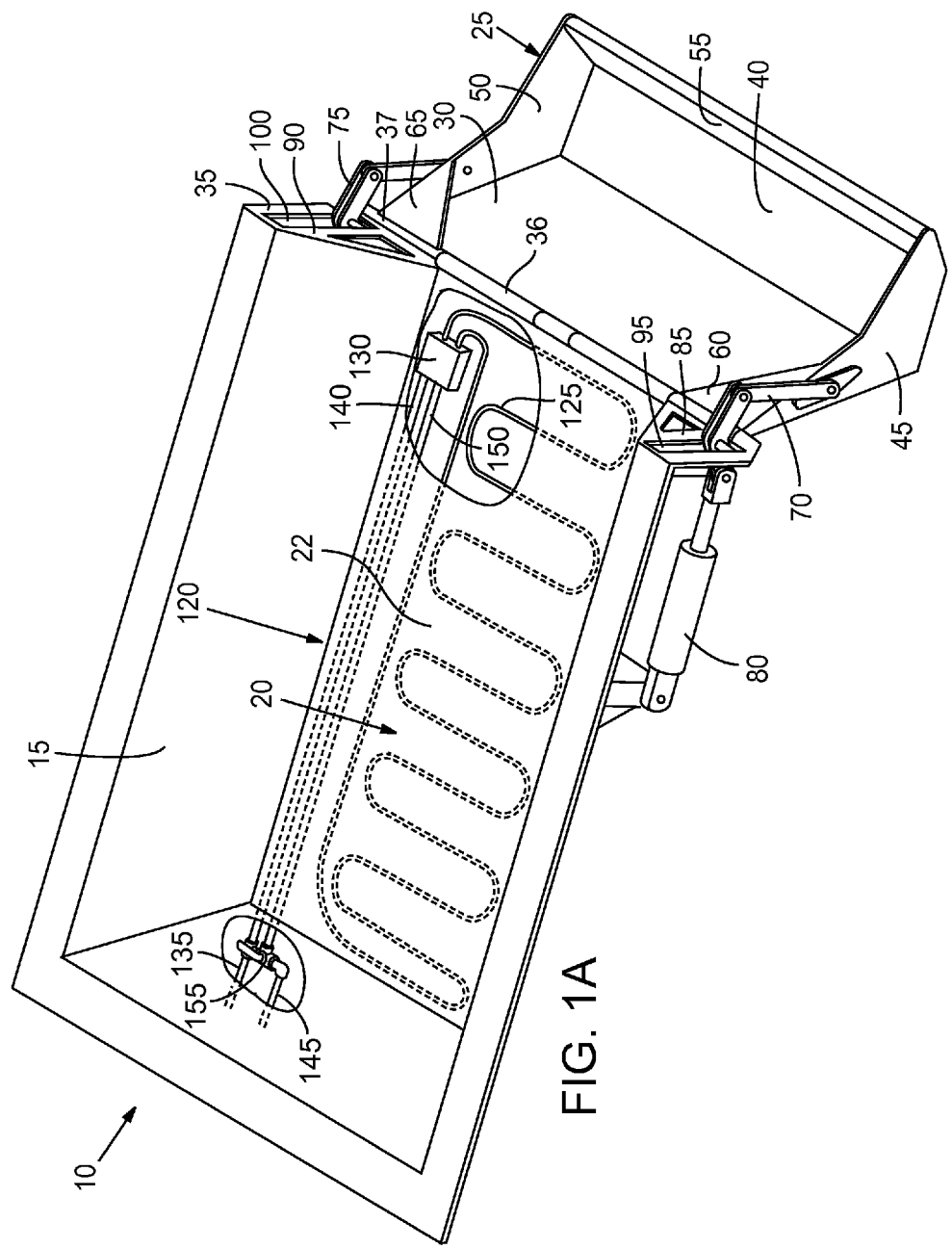
FIG. 1A is a pictorial view of a heating system located underneath the containment bed of the tailgate shoveling apparatus of FIG. 1.

With reference to FIG. 1A, the containment bed 20 preferably includes a heating system 120 including a built-in heat exchanger 125 fluidly circulating engine coolant to heat the containment bed 20 and the material contained therein. The heating system 120 further includes a manifold 130 and a series of hoses 135, 140, 145, and 150 connecting the manifold 130 to a 3-way valve 155 and a vehicle engine (not shown). In operation, engine coolant travels from the engine through hose 135, enters 3-way valve 155, continues through hose 140 and enters manifold 130. The coolant then continues from manifold 130 through heat exchanger 125 and returns to manifold 130. Thereafter, the coolant returns through hose 150, enters 3-way valve 155, continues through hose 145, and returns to the engine. As the engine coolant flows through the containment bed 20, it heats the containment bed 20 and, consequently, heats the material contained therein. The 3-way valve 155 controls the flow of engine coolant from the engine to the manifold 130. If material on the containment bed 20 has already reached proper heating or does not need any heating, the 3-way valve 155 may be shut off to stop the flow of engine coolant to the containment bed 20. For reducing heat loss, the heating system may include high-density elastomeric insulation, such as insulation, for example, surrounding the hoses 140 and 150.

In some embodiments, the dimensions of the containment bed 20 and the interior walls 15, 115 may be adapted to fit the bed of any suitable vehicle. Additionally, the interior walls 15, 115 may include other suitable angular orientations with respect to the containment bed floor 22, for example, substantially perpendicular in relation to the containment bed floor 22. In such embodiments, the triangular faces 85, 90 and the triangular panels 60, 65 may include other shapes, such as a square shape or other suitable shape for helping seal off the containment bed 20.

In other embodiments, the tailgate shoveling platform 25 including the upper and lower panels 30, 40, the side walls 45, 50, the lip 55, and the triangular panels 60, 65 may be constructed from a unitary piece of material, or the individual parts, or a subcombination thereof, may be welded, fastened together, or otherwise attached together using known attachment means. Further, the tailgate shoveling platform 25 may not include the triangular panels 60, 65 or lip 55.

In yet other embodiments, the tailgate shoveling apparatus 10 may include a suitable mechanical system for moving the tailgate shoveling platform 25 between an open and closed position.

Figure 4:
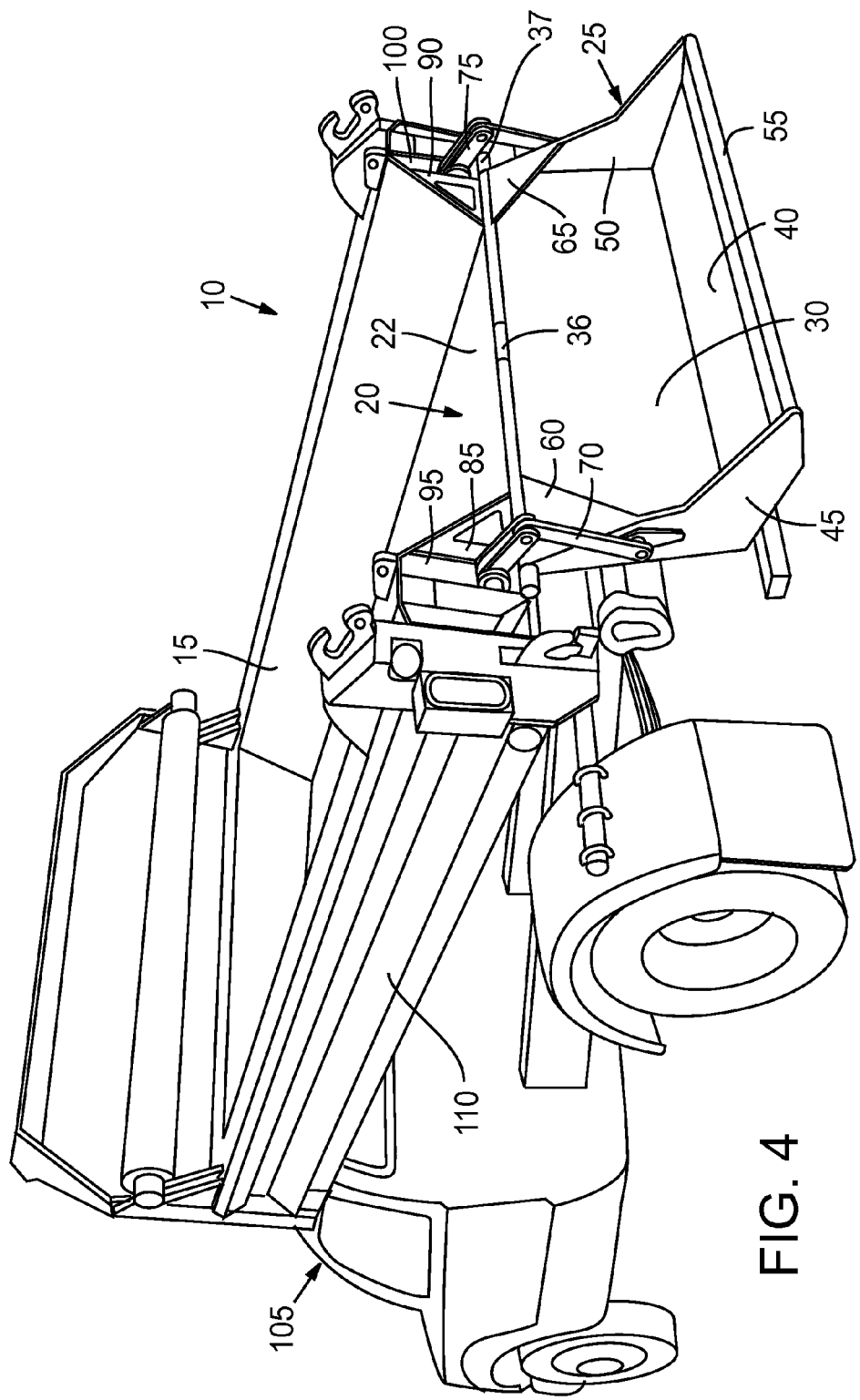
FIG. 4 is a pictorial view of the mounted tailgate shoveling platform of FIG. 1 illustrating the containment bed in a tilted position for helping move a material contained in the containment bed onto the tailgate shoveling platform.

FIGS. 3-4 illustrate the tailgate shoveling apparatus 10 mounted on the vehicle 105 with the tailgate shoveling platform 25 in an open position. When the tailgate shoveling platform 25 is in an open position, the lower panel 40 of the tailgate shoveling platform 25 is preferably substantially parallel to and spaced apart from the ground, thereby providing a platform at a comfortable height within an ergonomic area between a person's knees and shoulders commonly referred to as the "safe lifting zone." In such a placement, a person can safely and easily shovel, or otherwise unload, material from the tailgate shoveling platform 25 with reduced exertion. Preferably, the "safe lifting zone" ranges from about 1 foot for knee height to 6 feet for shoulder height to accommodate a person measuring between 5'0" and 7'0" in height.

In other embodiments, the tailgate shoveling platform 25 may be adjusted to different shoveling heights, including contacting the ground, to accommodate the height and "safe lifting zone" of a person.

FIG. 4 illustrates the containment bed 20 in a tilted position and the tailgate shoveling platform 25 in an open position. The tailgate shoveling apparatus 10 preferably includes a hydraulic system (not shown) operatively connected to the containment bed 20 and configured to tilt the containment bed 20 for helping move material into the tailgate shoveling platform 25. In other embodiments, the containment bed 20 may be tilted using a mechanical system or other known systems.

In a preferred operation, while the containment bed 20 is tilted, the tailgate shoveling platform 25 remains in the closed position to help prevent spillage. As the containment bed 20 is tilted, material slides toward tailgate shoveling platform 25. Once the containment bed 20 has been tilted to a desired degree and a desired amount of material has been moved toward the tailgate shoveling platform 25, the tailgate shoveling platform 25 is opened, causing material to slide from the containment bed 20 into the lower panel 40. The tailgate shoveling platform 25 is opened until it is spaced apart from the ground at a comfortable shoveling height for a worker. Thereafter, material can be shoveled or otherwise removed as needed. Once the desired amount of material has been removed, the tailgate shoveling platform 25 is returned to its closed position and any material remaining in the tailgate shoveling platform 25 is automatically returned to the containment bed 20 for future use. The containment bed 20 may then be tilted down to its original horizontal position.

In some instances, depending on the amount and type of material contained in the containment bed 20, the tailgate shoveling platform 25 may be moved to an open position, thereby moving material to the lower panel 40 as the containment bed 20 is tilted. In other instances, the tailgate shoveling platform 25 may be opened partially to allow some material to move into the lower panel 40, then the containment bed 20 may be tilted down partially or fully returned to its original horizontal position to prevent spillage or too much material from falling into the tailgate shoveling platform 25, and the tailgate shoveling platform 25 may thereafter be opened fully to a comfortable shoveling height. In yet other instances, a shovel or other tool may be used to help move material from the containment bed 20 into the tailgate shoveling platform 25.

While the tailgate shoveling apparatus 10 is described herein with reference to road repair and related uses, the tailgate shoveling apparatus 10 may be used for a variety of other applications. For instance, the tailgate shoveling platform 25 may be used to load and unload heavy appliances, equipment, or other items into and out of the containment bed 20.

It will be obvious to those having skill in the art that many changes may be made to the details of the above-described embodiments without departing from the underlying principles of the invention. The scope of the present invention should, therefore, be determined only by the following claims.

The invention claimed is:

1. A tailgate shoveling apparatus comprising:
   (a) an upper panel (30) having first and second sides and being adapted to be mounted in association with a bottom wall of a vehicle containment bed for pivotation with respect to such bottom wall from a generally upright position wherein said upper panel closes an end of such vehicle containment bed, to a downwardly-extending open position, said upper panel having a first left side and a first right side, a first length extending from a first proximate end proximate such containment bed to a first remote end remote from such containment bed;
   (b) a lower panel (40) having first and second ends, the first end being attached to said upper panel such that said lower panel can extend rearwardly of said upper panel when said upper panel is in such downwardly-extending open position, said lower panel (40) extending at a first angle intersecting the first side of said upper panel and being disposed on a first side of an imaginary plane which defines an extension of said upper panel, said lower panel having a second right side and a second left side, a second length extending from a second proximate end proximate said upper panel to a second remote end remote from said upper panel;
   (c) an upstanding lip (55) attached to the second end of said lower panel and extending from the second end of said lower panel at a second angle, greater than the first angle and extending away from the same imaginary plane on the same first side of said upper panel, an extension of such second angle intersecting the same imaginary plane on the same first side of said upper panel, said upstanding lip having a third right side and a third left side, a third length extending from a third proximate end proximate said lower panel to a third remote end remote from said lower panel;
   (d) a first side panel (45) directly attached to the third left side of said upstanding lip and to the second left side of said lower panel, and extending transverse to both of said lower panel and said upstanding lip, and along the full second and third lengths of said lower panel and said upstanding lip; and
   (e) a second side panel (50) directly attached to the third right side of said upstanding lip and to the second right side of said lower panel, and extending transverse to both of said lower panel and said upstanding lip, and along the full second and third lengths of said lower panel and said upstanding lip.

2. A tailgate shoveling apparatus as in claim 1 wherein, when said tailgate shoveling apparatus is in the open position, said lower panel can be spaced from ground level and can receive at least a portion of a material contained in the containment bed and height of said lower panel can be adjusted to hold such portion of material at a desirable shoveling height above ground level for a worker using said shoveling apparatus.

3. A tailgate shoveling apparatus as in claim 1, said lower panel being attached to said upper panel at a fixed angle.

4. A tailgate shoveling apparatus as in claim 1, said upstanding lip extending upwardly above said lower panel when said shoveling apparatus is in the open position with said lower panel parallel to a level surface.

5. A tailgate shoveling apparatus as in claim 1 wherein, when said upper panel is in the open position, said lower panel can be spaced from ground level and can receive at least a portion of a material contained in such containment bed and can hold such material at a desirable shoveling height above ground level for a worker using said shoveling apparatus.

6. A vehicle having a front and a rear, and comprising:
  (a) a chassis;
  (b) a containment bed, having a front and a rear, and mounted on said chassis, said containment bed comprising
    (i) a bottom wall,
    (ii) a first outer side wall extending upwardly from said bottom wall and extending from the front of said containment bed to the rear of said containment bed on a first side of said containment bed, said first outer side wall having a first outer surface facing away from said containment bed and a first inner surface facing toward said containment bed, and
    (iii) an opposing second outer side wall extending upwardly from said bottom wall and extending from the front of said containment bed to the rear of said containment bed on a second opposing side of said containment bed, said second outer side wall having a second outer surface facing away from said containment bed and a second inner surface facing toward said containment bed; and
  (c) a tailgate shoveling apparatus as in claim 1, mounted on said vehicle at said containment bed, said shoveling apparatus having a front and a rear and comprising
    (i) a shoveling apparatus floor,
    (ii) a first shoveling apparatus side wall extending upwardly from said shoveling apparatus floor, at an angle intersecting said first outer side wall of said containment bed, so as to form a first cavity between said first shoveling apparatus side wall and the inner surface of said first outer side wall, such first cavity extending from the rear of said containment bed toward the front of said containment bed, and
    (iii) a tailgate extending between said first shoveling apparatus side wall and said second outer side wall at the rear of said containment bed, and
    (iv) a tailgate linkage having a first end thereof operatively connected to said first shoveling apparatus side wall and a second end thereof operatively connected to said tailgate, said first linkage being housed in the first cavity between said first shoveling apparatus side wall and said first outer side wall when said tailgate is in a closed position.

7. A vehicle as in claim 6, further comprising a second shoveling apparatus side wall extending upwardly from said shoveling apparatus floor, at an angle intersecting said second outer side wall of said containment bed, so as to form a second cavity between said second shoveling apparatus side wall and the inner surface of said second outer side wall, such second cavity extending from the rear of said containment bed toward the front of said containment bed.

8. A vehicle as in claim 7, further comprising a second linkage having a first end thereof operatively connected to said second shoveling apparatus side wall and a second end thereof operatively connected to said tailgate, said second linkage being housed in the second cavity between said second shoveling apparatus side wall and said second outer side wall when said tailgate is in a closed position.

9. A vehicle, comprising;
  (a) a chassis;
  (b) a containment bed on said chassis said containment bed having a front and a rear; and
  (c) tailgate shoveling apparatus as in claim 1.

10. A tailgate shoveling apparatus, comprising:
  (a) a containment bed having front and rear ends, for containing material therein, the containment bed comprising
    (i) a containment bed floor for supporting material in said containment bed,
    (ii) a first interior wall having a first interior surface tapering toward said containment bed floor, and
    (iii) a second interior wall having a second interior surface tapering toward said containment bed floor; and
  (b) a tailgate shoveling platform comprising
    (i) an upper panel having a substantially planar surface, said upper panel having a first end pivotably connected to said containment bed proximate the rear end of said containment bed,
    (ii) a first side wall adjacent a first edge of said upper panel, said first side wall extending substantially perpendicular in relation to the surface of said upper panel,
    (iii) a first panel abutting an upper edge of said first side wall and the first end of said upper panel, said first panel being spaced apart from, and extending over, a first portion of said upper panel,
    (iv) a second side wall adjacent a second edge of said upper panel, said second side wall extending substantially perpendicular in relation to the surface of said upper panel, and
    (v) a second panel abutting an upper edge of said second side wall and the first end of said upper panel, said second panel being spaced apart from, and extending over, a second portion of said upper panel,
wherein said first panel is substantially flush against the first face of said first interior wall and said second panel is substantially flush against the second face of said second interior wall when the tailgate shoveling platform is in the first position thereby closing the rear end of said containment bed.

11. A vehicle-based cargo carrier, comprising:
  (a) a containment bed having a front end and a rear end, for containing material therein, the containment bed comprising
    (i) a containment bed floor for supporting material in said containment bed,
    (ii) a first upstanding containment bed wall on a first side of said containment bed, and
    (iii) a second upstanding containment bed wall on a second opposing of said containment bed; and
  (b) a tailgate apparatus comprising an unloading platform adapted to pivot, relative to the rear of said containment bed, from a first closed position wherein said tailgate apparatus closes the rear end of said containment bed, to an open position, (i) at least a portion of said platform, in the open position, being generally parallel to the ground and spaced from the ground, (ii) said platform, in the open position, being adjustable to different heights to present said platform at a desirable height for a worker using said tailgate apparatus to retrieve material from said platform, (iii) said platform being further configured such that, when said platform is moved from an open position to the closed position, said platform returns any material, which may be on said platform, to said containment bed, said unloading platform comprising an upper panel (30), having first and second sides, mounted in association with said containment bed floor at the rear of said containment bed for pivotation with respect to said containment bed floor from a generally upright position wherein said upper panel closes the rear of said containment bed, to a downwardly-extending open position, said upper panel having a first left side and a first right side, a first length extending from a first proximate end proximate such containment bed to a first remote end remote from such containment bed;

a lower panel (40) having first and second ends, the first end being attached to said upper panel such that said lower panel can extend rearwardly of said upper panel when said upper panel is in such downwardly-extending open position, said lower panel extending at a first angle intersecting the first side of said upper panel and being disposed on a first side of an imaginary plane which defines an extension of said upper panel, said lower panel having a second right side and a second left side, a second length extending from a second proximate end proximate said upper panel to a second remote end remote from said upper panel;

an upstanding lip (55) attached to the second end of said lower panel and extending from the second end of said lower panel at a second angle, greater than the first angle and extending away from the same imaginary plane on the same first side of said upper panel, an extension of such second angle intersecting the same imaginary plane on the same first side of said upper panel, said upstanding lip having a third right side and a third left side, a third length extending from a third proximate end proximate said lower panel to a third remote end remote from said lower panel;

a first side panel (45) directly attached to the third left side of said upstanding lip and to the second left side of said lower panel, and extending transverse to both of said lower panel and said upstanding lip, and along the full second and third lengths of said lower panel and said upstanding lip; and a second side panel (50) directly attached to the third right side of said upstanding lip and to the second right side of said lower panel, and extending transverse to both of said lower panel and said upstanding lip, and along the full second and third lengths of said lower panel and said upstanding lip.

12. A cargo carrier as in claim 11, said upstanding lip extending upwardly above the second end of said lower panel when said lower panel is extending rearwardly of said upper panel.

13. A tailgate shoveling apparatus comprising:

(a) an upper panel (30) having first and second sides and being adapted to be mounted in association with a bottom wall of a vehicle containment bed for pivotation with respect to such bottom wall from a generally upright position wherein said upper panel closes an end of such vehicle containment bed, to a downwardly-extending open position, said upper panel having a first left side and a first right side, a first length extending from a first proximate end proximate such containment bed to a first remote end remote from such containment bed;

(b) a lower panel (40) having first and second ends, the first end being attached to said upper panel such that said lower panel can extend rearwardly of said upper panel when said upper panel is in such downwardly-extending open position, said lower panel (40) extending at a first angle intersecting the first side of said upper panel and being disposed on a first side of an imaginary plane which defines an extension of said upper panel, said lower panel having a second right side and a second left side, a second length extending from a second proximate end proximate said upper panel to a second remote end remote from said upper panel;

(c) an upstanding lip (55) attached to the second end of said lower panel and extending from the second end of said lower panel at a second angle, greater than the first angle and extending away from the same imaginary plane on the same first side of said upper panel, an extension of such second angle intersecting the same imaginary plane on the same first side of said upper panel, said upstanding lip having a third right side and a third left side, a third length extending from a third proximate end proximate said lower panel to a third remote end remote from said lower panel;

(d) a first side panel (45) directly attached to the third left side of said upstanding lip, to the second left side of said lower panel, and to the first left side of said upper panel, and extending transverse to all of said upper panel, said lower panel, and said upstanding lip; and (e) a second side panel (50) directly attached to the third right side of said upstanding lip, to the second right side of said lower panel, and to the first right side of said upper panel, and extending transverse to all of said upper panel, said lower panel, and said upstanding lip.

14. A vehicle-based cargo carrier, comprising:

(a) a containment bed having a front end and a rear end, for containing material therein, the containment bed comprising (i) a containment bed floor for supporting material in said containment bed, (ii) a first upstanding containment bed wall on a first side of said containment bed, and (iii) a second upstanding containment bed wall on a second opposing side of said containment bed; and (b) a tailgate apparatus comprising an unloading platform adapted to pivot, relative to the rear of said containment bed, from a first closed position wherein said tailgate apparatus closes the rear end of said containment bed, to an open position, (i) at least a portion of said platform, in the open position, being generally parallel to the ground and spaced from the ground, (ii) said platform, in the open position, being adjustable to different heights to present said platform at a desirable height for a worker using said tailgate apparatus to retrieve material from said platform, (iii) said platform being further configured such that, when said platform is moved from an open position to the closed position, said platform returns any material, which may be on said platform, to said containment bed, said unloading platform comprising an upper panel (30), having first and second sides, mounted in association with said containment bed floor at the rear of said containment bed for pivotation with respect to said containment bed floor from a generally upright position wherein said upper panel closes the rear of said containment bed, to a downwardly-extending open position, said upper panel having a first left side and a first right side, a first length extending from a first proximate end proximate such containment bed to a first remote end remote from such containment bed;

a lower panel (40) having first and second ends, the first end being attached to said upper panel such that said lower panel can extend rearwardly of said upper panel when said upper panel is in such downwardly-extending open position, said lower panel extending at a first angle intersecting the first side of said upper panel and being disposed on a first side of an imaginary plane which defines an extension of said upper panel, said lower panel having a second right side and a second left side, a second length extending from a second proximate end proximate said upper panel to a second remote end remote from said upper panel;

an upstanding lip (55) attached to the second end of said lower panel and extending from the second end of said lower panel at a second angle, greater than the first angle and extending away from the same imaginary plane on the same first side of said upper panel, an extension of such second angle intersecting the same imaginary plane on the same first side of said upper panel, said upstanding lip having a third right side and a third left side, a third length extending from a third proximate end proximate said lower panel to a third remote end remote from said lower panel;

a first side panel (45) directly attached to the third left side of said upstanding lip, to the second left side of said lower panel, and to the first left side of said upper panel, and extending transverse to all of said upper panel, said lower panel, and said upstanding lip; and a second side panel (50) directly attached to the third right side of said upstanding lip, to the second right side of said lower panel, and to the first right side of said upper panel, and extending transverse to all of said upper panel, said lower panel, and said upstanding lip.

\* \* \* \* \*